United States Patent

Rathjen et al.

[15] 3,636,533

[45] Jan. 18, 1972

[54] MEMORY CORE SUBMODULE

[72] Inventors: Julius Fred Rathjen, Franklin Lakes; Morris O. Stein, Wayne, both of N.J.

[73] Assignee: The Singer Company, New York, N.Y.

[22] Filed: Nov. 28, 1969

[21] Appl. No.: 880,639

[52] U.S. Cl. ................340/174 M, 340/174 VA, 340/174 S, 340/174 JA

[51] Int. Cl. ..........................................................G11b 5/00

[58] Field of Search........340/174 VA, 174 S, 174 M, 174 JA

[56] References Cited

UNITED STATES PATENTS

| | | | |
|---|---|---|---|
| 3,257,649 | 6/1966 | Dietrich | 340/174 VA |
| 3,271,747 | 9/1966 | Harner | 340/174 VA |
| 3,102,999 | 9/1963 | Bernemyr | 340/174 S |
| 3,400,455 | 9/1968 | Cosgrove | 340/174 VA |

*Primary Examiner*—Maynard R. Wilbur
*Assistant Examiner*—Robert F. Gnuse
*Attorney*—S. A. Giarratana and S. Michael Bender

[57] ABSTRACT

A memory core submodule wherein at least one printed circuit board is laminated to opposite surfaces of an aluminum heat sink and a shield sheet is laminated to the outer surface of each of the circuit boards. An array of magnetic core members are fixed with respect to the outer surface of each of the shield sheets, and are electrically connected to the circuit boards.

5 Claims, 6 Drawing Figures

PATENTED JAN 18 1972 3,636,533

INVENTORS
JULIUS FRED RATHJEN
MORRIS O. STEIN
BY
S. G. Giarratana
ATTORNEYS

INVENTORS:
JULIUS FRED RATHJEN
MORRIS O. STEIN
BY
ATTORNEYS

MEMORY CORE SUBMODULE

BACKGROUND OF THE INVENTION

This invention relates to a memory core submodule, and more particularly, to such a submodule providing an array of magnetic core members electrically connected with respect to one or more laminated printed circuit boards.

According to prior art proposals, an array of memory cores have been mounted in a unitary manner for use in computer applications, etc. by interconnecting the core matrixes by a plurality of magnetic wire bundles. However, the use of the wire bundles, in addition to being bulky and heavy, causes uncertainty in line to line coupling, which produces a large variation in the rise time of the drive current pulse. This, in turn, causes the core output signal to be shifted in proportion to this variation, thereby rendering the strobing or sensing of the core output signal very difficult.

SUMMARY OF THE INVENTION

It is, therefore, an object of the present invention to provide a memory core submodule which eliminates wire bundles, which is compact in volume and weight, and which provides good line to line coupling.

Toward the achievement of this object, the memory core submodule of the present invention comprises a base member adapted to serve as a heat sink, at least one printed circuit board laminated to opposite surfaces of said base member, a shield sheet laminated to the outer surface of each of said printed circuit boards, an array of magnetic core members fixed with respect to the outer surface of each of said shield sheets, and means to electrically connect said core members to at least one of said printed circuit boards.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings.

DESCRIPTION OF THE PREFERRED EMBODIMENTS

Figure 1:
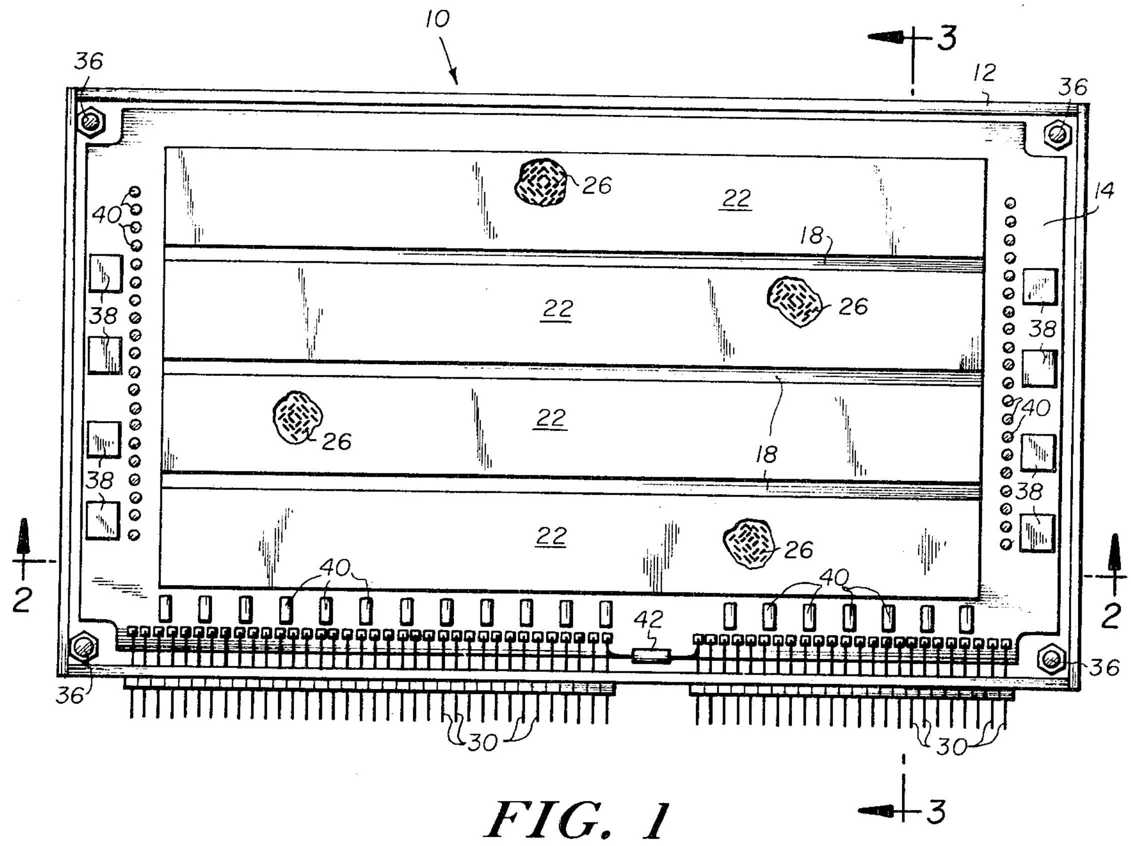
FIG. 1 is a top plan view of the memory core submodule of the present invention with the top cover sheet removed.
Figure 2:
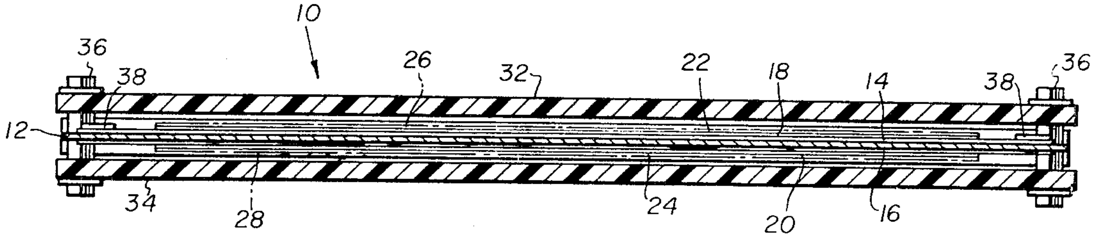
FIG. 2 is a cross-sectional view taken along the lines 2—2 of FIG. 1.
Figure 3:
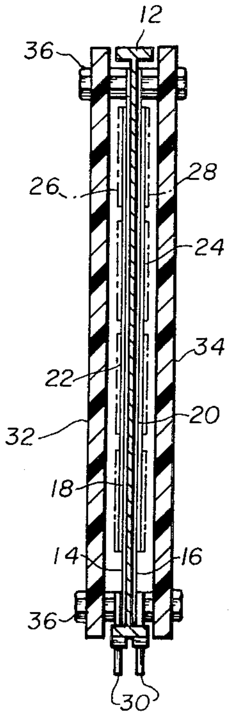
FIG. 3 is a cross-sectional view taken along the lines 3—3 of FIG. 1.

Referring specifically to FIGS. 1–3 of the drawings, the reference numeral 10 refers in general to a submodule constructed according to the present invention. The submodule comprises a heat sink 12 of aluminum or a similar material with its sides having a T-shaped cross section as shown in FIG. 3. A pair of printed circuit boards 14 and 16 are laminated to the upper and lower surfaces of the heat sink 12, respectively, as shown in FIGS. 2 and 3. These circuit boards may be of any known type such as, for example, a baseboard or sheet having a copper material formed on the upper and lower surfaces thereof which is photoetched to form the circuits. Of course, each circuit board may consist of any number of layers formed in this manner, depending on the amount of circuits needed.

A pair of shield sheets 18 and 20 of a copper material are laminated to the outer surfaces of the circuit boards 14 and 16, respectively, and are adapted to provide shielding between the printed circuit boards and the remaining components of the submodule.

Two sheets 22 and 24 of adhesive tape are adhered to the outer surfaces of the electrostatic shield sheets 18 and 20, respectively, and have a sticky upper surface which is adapted to receive a plurality of toroidal-shaped memory cores 26 which extend upright with their axes parallel to the plane of the tape. Each sheet 22 and 24, instead of being continuous, can be in the form of two or more strips as shown in FIG. 1, in the event it is desired to group the cores in any manner.

A plurality of connector pins 30 are electrically connected to the outer edges of the circuit boards 14 and 16, and extend outwardly through the flanged portions of the heat sink 12. The outwardly extending portions of the pins serve to connect the circuit board to any external connection such as a computer or the like, including, of course, a source of electrical power.

A pair of plastic cover sheets 32 and 34 cover the unit, and are fastened together and spaced apart by a plurality of fasteners 36 extending through the sheets 32 and 34, and the heat sink 12. These cover sheets add stability to the unit and protect the memory cores from damage.

Additional components may be mounted on the outer surfaces of the printed circuit boards 14 and 16. For example, a plurality of flat packs in the form of memory selection diodes 38 are electrically connected in the circuits provided by the circuit boards 14 and 16 to direct the flow of current through the cores. The several solder connections required for such connections and for other necessary connections are located on the circuit board 14 as shown, in general, by the reference numeral 40 in FIG. 1.

A temperature sensor, in the form of a resistor 42 is provided on the circuit board 14 and is connected between a pair of pins 30 to give an output based on the temperature of the unit.

Figure 4:
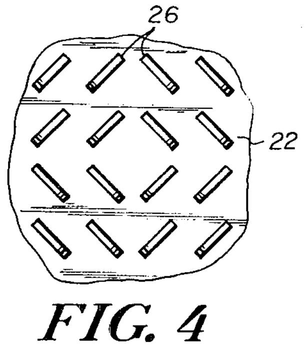
FIG. 4 is an enlarged partial top plan view of a portion of the memory cores of FIG. 1.
Figure 5:
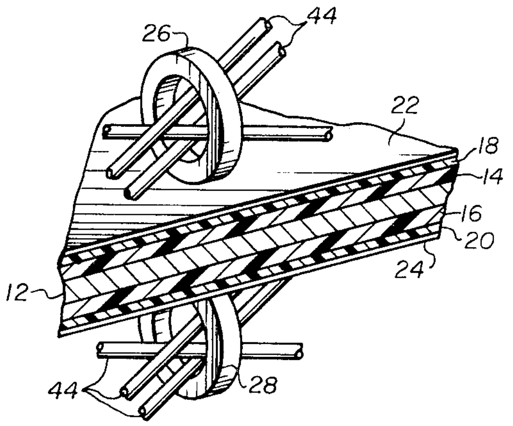
FIG. 5 is an enlarged perspective view of a single memory core and its associated electrical conductors.

As shown in FIGS. 4 and 5, the memory cores 26 are oriented so that they extend in two directions according to the direction of current flow, and each core has three electrical conductors 44 extending therethrough which, in turn, are connected to the various circuits on the boards 14 and 16. The conductors, by passing currents through the cores, permit them to attain predetermined flux characteristics in connection with the particular memory function required, and to sense and inhibit the changes in the flux characteristics, in a known manner.

Figure 6:
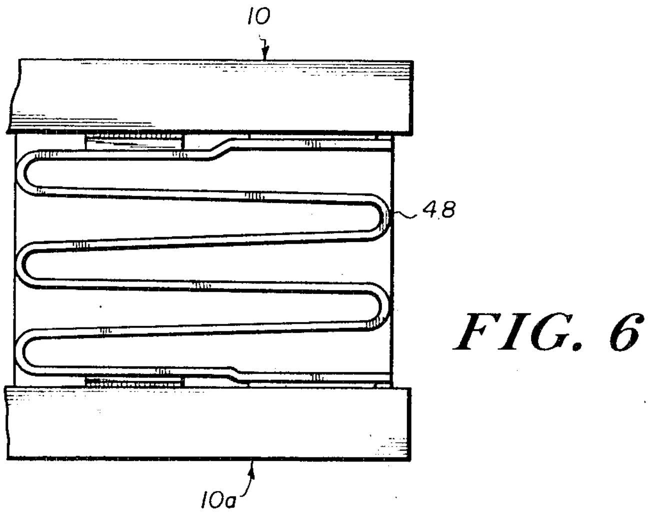
FIG. 6 is a view similar to FIG. 2 but depicting two submodules connected in accordance with the present invention.

FIG. 6 of the drawings depicts the submodule 10 electrically connected to an identical submodule **10*a* by means of a multiconductor flex connectors 48 soldered to an end of the circuit board 16 of the submodule 10 and to a similar board of the submodule 10*a***, it being understood that a similar-type conductor is similarly fastened to the other ends of the circuit boards. This, of course, is a convenient way of doubling the capability of the submodule while increasing its dimensions in only one direction.

As an example of the size, weight, and capability of the submodule of the present invention, a submodule arranged according to FIG. 6, and utilizing 20-mil diameter memory cores can have a memory 20of 4,096 words by 32 bits per word, and would be approximately 14 cubic inches in volume and approximately 1 pound in weight. It is noted that the above memory capability may be changed to a 8,192 words by 16 bits per word by merely changing the orientation of the memory cores, on the wiring of the circuit boards.

In addition to being extremely compact in size and weight, the submodule of the present invention has many other advantages. For example, the printed circuit boards laminated to an integral heat sink provides equal line to line interconnect spacing and a good thermal path from the memory core array to the heat sink, which eliminates the disadvantages associated with the prior art as discussed above. Also, the modular memory construction and the convenient interconnection between the units, allows use of multiple memory cards to achieve larger memory capacities. Further, the use of the flat pack memory selection diodes 38 as an integral part of the memory board provides short distance electrical connections between the diode assembly and the core array, and a minimum number of solder connections.

Of course, variations of the specific construction and arrangement of the submodule disclosed above can be made by those skilled in the art without departing from the invention as defined in the appended claims.

We claim:

1. A memory core submodule comprising a base member adapted to serve as a heat sink, at least one printed circuit board laminated to opposite surfaces of said base member, a shield sheet laminated to the outer surface of each of said printed circuit boards, an array of toroidal-shaped magnetic core members fixed with respect to the outer member of each of said shield sheets, each core member having an axis of symmetry, said axis being disposed substantially parallel to its shield sheet, said core members being oriented so that said core members extend in either of two directions according to the direction of current flow therethrough, means to electrically connect said core members to at least one of said printed circuit boards, said connecting means of said core members including a plurality of electrical conductors arranged so that each core member has three electrical conductors extending therethrough, and a tape having adhesive formed on two surfaces thereof, said tape being adhered to the outer surface of each of said shield sheets, the outer surface of said tape adapted to retain said core members.

2. The submodule of claim 1 further comprising at least one memory selection diode fixed with respect to at least one of said circuit boards, and wherein the axes of the core members which are oriented in one said direction are disposed substantially at right angles to the axes of the core members which are oriented in the other said direction.

3. The submodule of claim 2 further comprising temperature sensing means mounted on at least one of said printed circuit boards, and wherein said base member has a plurality of sides, each side having a T-shaped cross section for enclosing said magnetic core member, and including a pair of cover sheets mounted on and spaced from opposite surfaces of said base member for enclosing said magnetic core members.

4. The submodule of claim 3 further comprising a plurality of pin connectors fixed with respect to at least one of said circuit boards and adapted to connect the circuit thereon to an external means.

5. The submodule of claim 4 further comprising flexible electrical connecting means for connecting said submodule to another submodule.

* * * * *